(12) United States Patent
Chin

(10) Patent No.: US 12,107,640 B2
(45) Date of Patent: *Oct. 1, 2024

(54) CONTROLLER NETWORK WITH BREAK WARNING FEATURES

(71) Applicant: Tyco Fire & Security GmbH, Neuhausen am Rheinfall (CH)

(72) Inventor: Teoh Yong Chin, Subang Jaya (MY)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,347

(22) Filed: Sep. 12, 2023

(65) Prior Publication Data

US 2024/0080064 A1    Mar. 7, 2024

Related U.S. Application Data

(63) Continuation of application No. 17/525,291, filed on Nov. 12, 2021, now Pat. No. 11,784,680.

(30) Foreign Application Priority Data

Aug. 1, 2021   (MY) .............................. PI2021004434

(51) Int. Cl.
*H04B 3/46*       (2015.01)
*H04L 41/12*      (2022.01)
*H04L 43/0817*    (2022.01)

(52) U.S. Cl.
CPC .............. *H04B 3/46* (2013.01); *H04L 41/12* (2013.01); *H04L 43/0817* (2013.01)

(58) Field of Classification Search
CPC ....... H04B 3/46; H04L 41/12; H04L 43/0817; H04L 43/045; H04L 43/0811; H04L 41/22; H04L 41/5012
See application file for complete search history.

(56) References Cited

U.S. PATENT DOCUMENTS 11,029,810 B2 *  6/2021  Nanjappan ............ B66B 5/0037
11,784,680 B2 * 10/2023  Chin ................... H04L 43/0817
                                                        375/224
2001/0010032 A1  7/2001  Ehlers et al.
(Continued)

*Primary Examiner* — Khanh C Tran
(74) *Attorney, Agent, or Firm* — Foley & Lardner LLP

(57) ABSTRACT

A system includes a plurality of controllers associated with the plurality of units of building equipment, each controller comprising a plurality of communication ports, a plurality of cables connected to the plurality of communication ports and linking together the plurality of controllers, wherein the plurality of controllers are configured to self-identify a break in a connection between two the plurality of controllers by monitoring statuses of the plurality of communication ports. The system also includes circuitry configured to receive a signal indicative of the order of the connections between the plurality of controllers from the plurality of controllers, generate a graphical map of the order of the connections between the plurality of controllers based on the signal, receive, from the plurality of controllers, an indication of a break in a connection between two of the plurality of controllers, and update the graphical map to indicate the connection as broken.

20 Claims, 10 Drawing Sheets

(56) References Cited

U.S. PATENT DOCUMENTS

| | | |
|---|---|---|
| 2006/0282529 A1* | 12/2006 | Nordin ................ H04L 43/0811 |
| | | 709/224 |
| 2011/0047418 A1 | 2/2011 | Drees et al. |
| 2013/0107041 A1 | 5/2013 | Norem et al. |
| 2018/0167301 A1 | 6/2018 | Hoglund |
| 2019/0372798 A1 | 12/2019 | Soya et al. |
| 2020/0162285 A1 | 5/2020 | Drury et al. |
| 2020/0244699 A1 | 7/2020 | Hutchinson et al. |
| 2021/0141346 A1* | 5/2021 | Wenzel ................ G05B 13/041 |

* cited by examiner

CONTROLLER NETWORK WITH BREAK WARNING FEATURES

CROSS-REFERENCE TO RELATED APPLICATION

This application is a continuation of U.S. patent application Ser. No. 17/525,291, filed Nov. 12, 2021, which claims priority to Malaysia Patent Application No. PI2021004434, filed Aug. 1, 2021, the entire disclosure of each are incorporated by reference herein.

BACKGROUND

The present disclosure relates generally to a building management system (BMS) and more particularly to a BMS with automatic equipment/device point mapping. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS can include distributed controllers or other electronic devices that control various units of building equipment. One challenge with a BMS is maintaining connectivity of the controllers of the BMS, understanding the connections between controllers in the BMS, and diagnosing and solving and connection errors.

SUMMARY

One implementation of the present disclosure is a system for controlling a plurality of units of building equipment. The system includes a plurality of controllers associated with the plurality of units of building equipment, each controller comprising a plurality of communication ports, a plurality of cables connected to the plurality of communication ports and linking together the plurality of controllers, wherein the plurality of controllers are configured to self-identify a break in a connection between two the plurality of controllers by monitoring statuses of the plurality of communication ports. The system also includes circuitry configured to receive a signal indicative of the order of the connections between the plurality of controllers from the plurality of controllers, generate a graphical map of the order of the connections between the plurality of controllers based on the signal, receive, from the plurality of controllers, an indication of a break in a connection between two of the plurality of controllers, and update the graphical map to indicate the connection as broken.

In some embodiments, the system also includes a passive network switch coupled to one or more of the plurality of Ethernet cables. In some embodiments, a spanning tree protocol is executed locally on the plurality of controllers. In some embodiments, the plurality of controllers are configured to detect a loss of connection at one of the plurality of communication ports and, in response to detecting the loss of the connection, cause the signal to be transmitted to the circuitry.

In some embodiments, the plurality of controllers are connected together in a loop configuration before the break in the connection between two of the plurality of controllers. The plurality of controllers may be configured to automatically self-heal from the loop configuration to a chain configuration.

In some embodiments, the plurality of controllers are configured to self-identify the order of the connections between the plurality of controllers by periodically broadcasting, from a first controller of the plurality of controllers, a discovery message, in response to the discovery message, broadcasting, from a remainder of the plurality of controllers, a data packet indicating at least two of a controller identity, a designated port identity, a root port identity, a port status, a physical link status, and a hostname, and identifying the order of connections based on the data packets.

In some embodiments, the graphical map includes a node for each of the plurality of controllers and a plurality of lines indicating the connections between the plurality of controllers. In some embodiments, the plurality of control ports comprise a plurality of control ports configured to be connected to the plurality of units of building equipment. The plurality of controllers may be configured to receive inputs from the plurality of units of building equipment and transmit control outputs to the plurality of units of building equipment via the plurality of control ports.

Another implementation of the present disclosure is a method. The method includes linking together a plurality of controllers using a plurality of communication pathways, self-identifying, by the plurality of controllers, an order of connections between the plurality of controllers, generating a graphical map of the order of the connections between the plurality of controllers self-identified by the plurality of controllers, automatically detecting, by a first controller of the plurality of controllers, a loss of communication at a first communication port of the first controller by monitoring a status of the first communication port, and updating the graphical map to indicate the connection as broken.

In some embodiments, the method includes connecting a passive network switch to at least one of the plurality of controllers. In some embodiments, the method includes executing a spanning tree protocol locally on the plurality of controllers. In some embodiments, the method includes detecting, by a first controller of the plurality of controllers, a loss of communication at a first communication port of the first controller, and in response to detecting the loss of connection, generating a signal indicative of the break in the connection.

In some embodiments, linking together the plurality of controllers includes creating a loop configuration. The method also includes automatically self-healing the loop configuration to a chain configuration in response to the break. In some embodiments, updating the graphical map to indicate the connection as broken by changing a color of a graphical representation of the connection. The method may also include providing the graphical map to a user via web browser.

In some embodiments, self-identifying, by the plurality of controllers, an order of connections between the plurality of controllers, includes periodically broadcasting, from a first controller of the plurality of controllers, a discovery message, in response to the discovery message, broadcasting, from a remainder of the plurality of controllers, a data packet indicating at least two of a controller identity, a designated port identity, a root port identity, a port status, a physical link status, and a hostname, and identifying the order of connections based on the data packets.

In some embodiments, the graphical map includes a node for each of the plurality of controllers and a plurality of lines indicating the connections between the plurality of controllers. In some embodiments, the method further comprises controlling, by the plurality of controllers, a plurality of units of building equipment.

In some embodiments, the controller of claim 17 includes a controller includes a plurality of communication ports configured to be placed in communication with a plurality of additional controllers, a plurality of control ports configured to be placed in communication with building equipment, and circuitry configured to automatically determine identities of the plurality of additional controllers and an order of connections of the controller and the plurality of additional controllers and automatically detect a break in a connection between at least one of the plurality of communication ports at least one of the plurality of additional controllers by monitoring statuses of the plurality of communication ports. The circuitry is also configured to transmit, to an external computer system, a first indication of the order of the connections of the controller and the plurality of additional controllers and a second indication of the break.

In some embodiments, the controller is configured to execute a spanning tree protocol. In some embodiments, the second indication is configured to cause an alert to be provided to a user. In some embodiments, the circuitry is further configured to generate control signals for the building equipment and cause the control signals to be communicated to the building equipment via at least one of the plurality of control ports.

DETAILED DESCRIPTION

Building HVAC Systems and Building Management Systems

Figure 1:
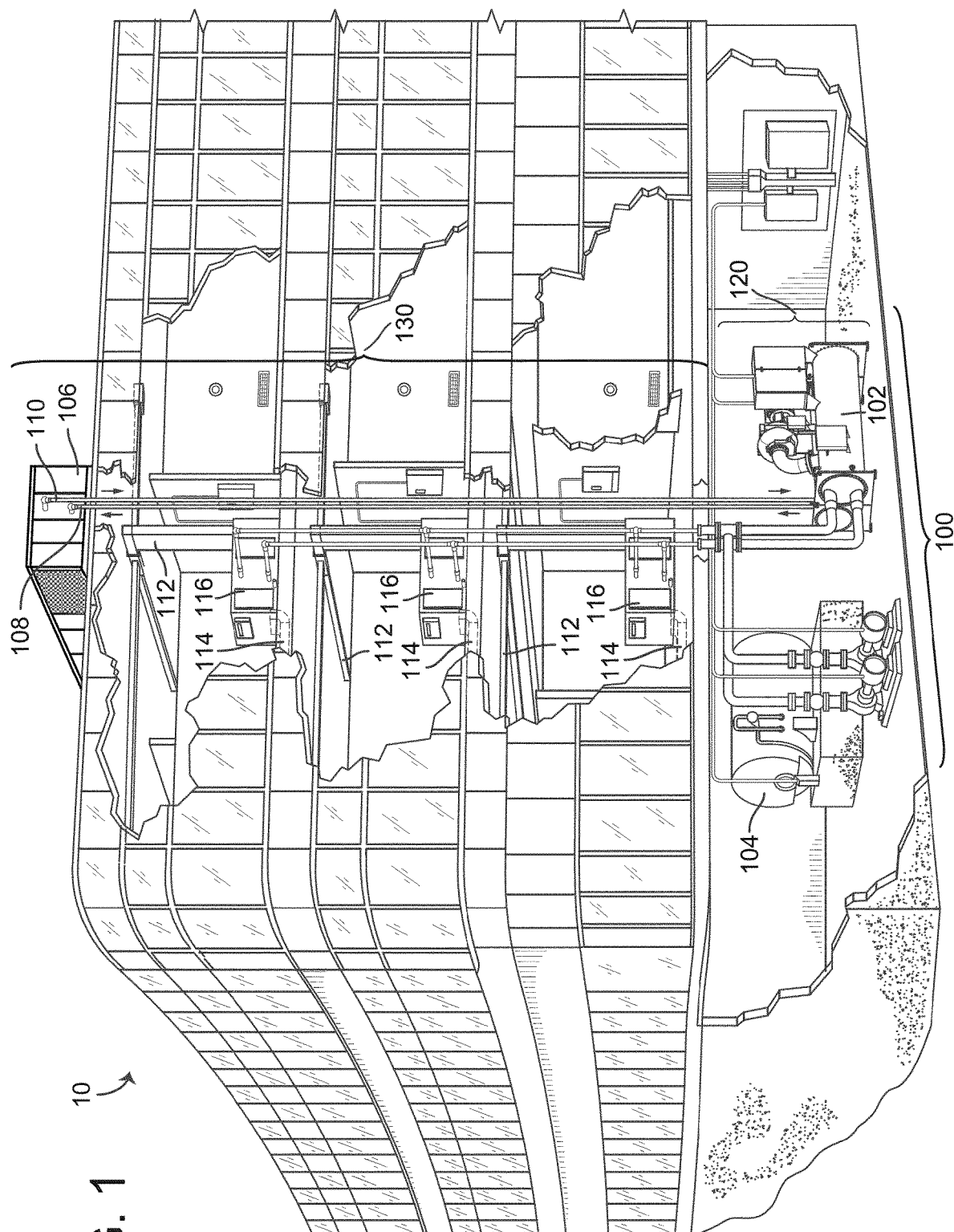
FIG. 1 is a drawing of a building equipped with a HVAC system, according to some embodiments.
Figure 2:
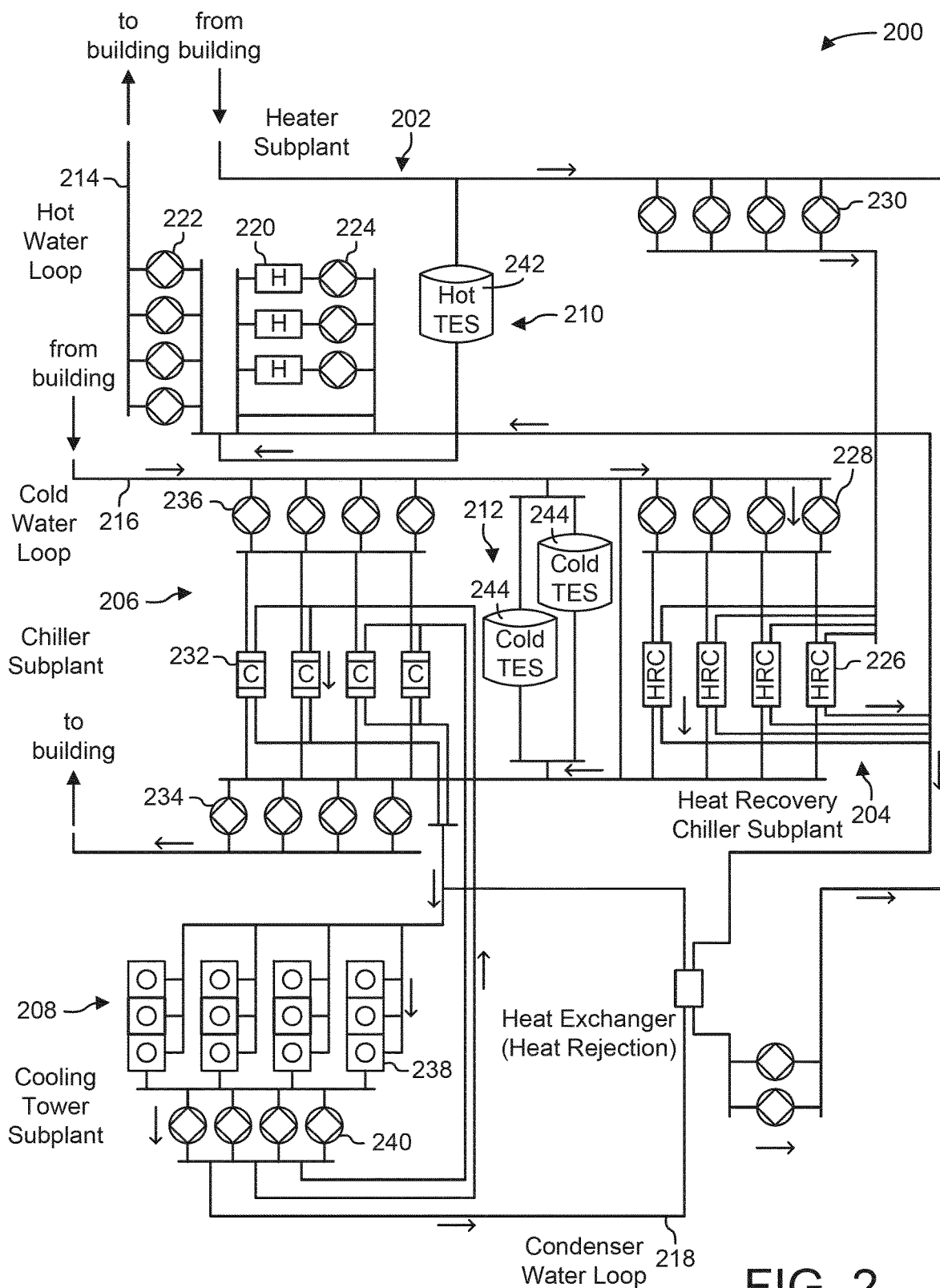
FIG. 2 is a block diagram of a waterside system which can be used to serve the building of FIG. 1, according to some embodiments.
Figure 3:
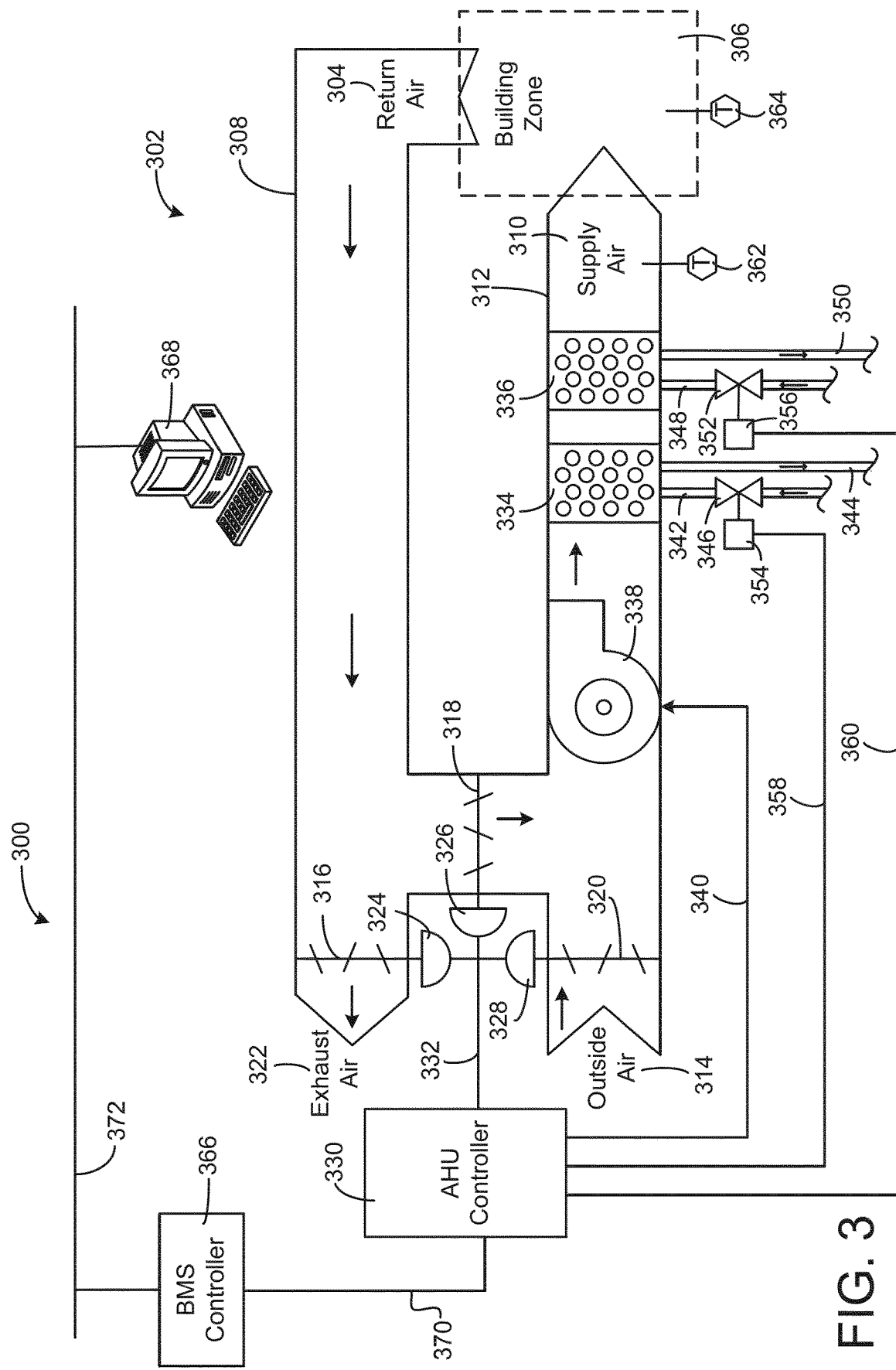
FIG. 3 is a block diagram of an airside system which can be used to serve the building of FIG. 1, according to some embodiments.
Figure 4:
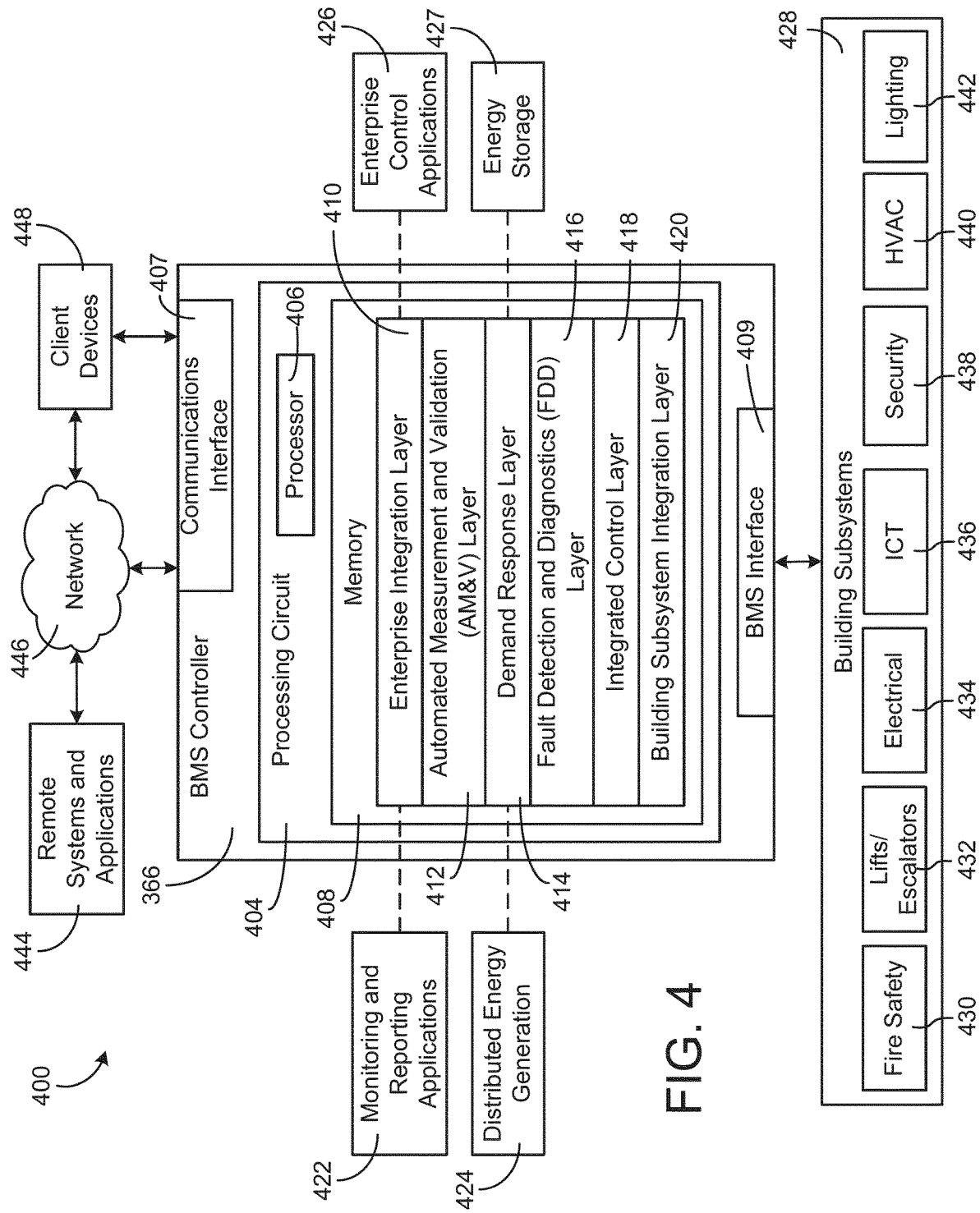
FIG. 4 is a block diagram of a building management system (BMS) which can be used to monitor and control the building of FIG. 1, according to some embodiments.
Figure 5:
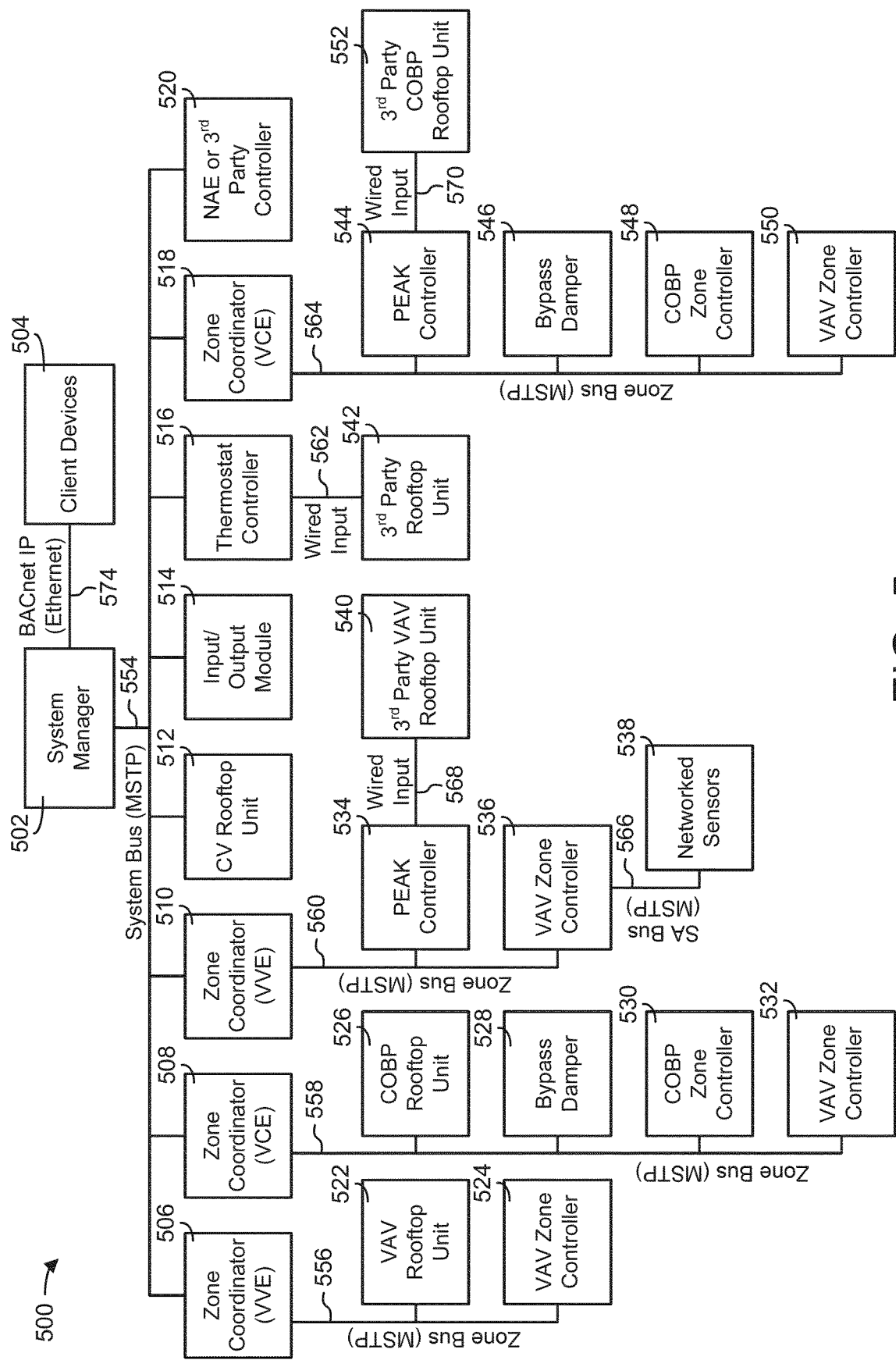
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Controller Networks with Self-Mapping and Break Warning Features

Referring generally to FIGS. 6-11, systems and methods relating to controller networks with self-mapping and break warning features are shown, according to various embodiments. As described in detail below, controllers of a building management system (e.g., BMS 500 and the various controllers and coordinators thereof) can be configured to be communicatively connected together in a loop or daisy-chain network, for example by cables (e.g., Ethernet cables) connected therebetween. Each controller can be connected to two neighboring controllers, for example. As described in detail below, a system of controllers can be configured to self-identify its order of connection such that a graphical map of the network of controllers can be automatically generated, including without using a smart or specialized network switch. Additionally, as detailed below, the controllers herein can self-identify a break in connection between two of the controllers, even where redundancy in the network (as in a loop configuration) ensures that all controllers stay in communication following the break. The break can also be displayed on the graphical map of the network, for example such that a user can advantageously see where the break occurred relative to the controllers. Such a display can help a user in diagnosing and repairing any faults, failures, breakdowns, disconnections, etc. in the network of controllers, including before such an event results in complete loss of communication to any of the controller or connected equipment. These and other technical advantages of the present application will become apparent from the following description.

Figure 6:
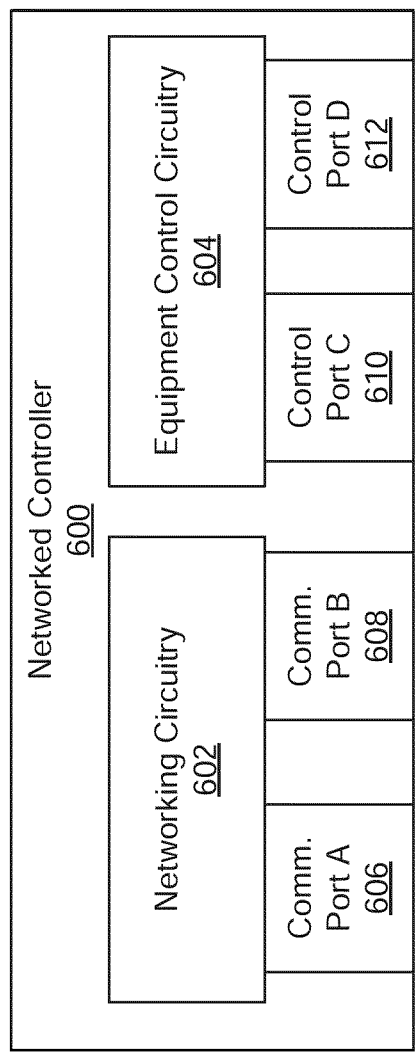
FIG. 6 is a block diagram of a networked controller, according to some embodiments.

Referring now to FIG. 6, a block diagram of a networked controller 600 is shown, according to an exemplary embodiments. The networked controller 600 can to implement one or more of the various zone controllers 524, 530, 532, 536, and 548-550, the PEAK controllers 534, 544, the coordinators 506, 508, 510, 518, 520, etc. of FIG. 5, in various embodiments. The networked controller 600 is configured to be communicably coupled to additional networked controller 600 to communicate with the additional networked controllers 600 (e.g., using IT protocols) and to be communicably coupled to one or more units of building equipment (e.g., devices of building subsystems 428 described above)

to control the building equipment. As described below, the networked controller 600 is configured to identify neighboring controllers in a network and automatically a break or loss of connection to one if its neighbors in the network.

As shown in FIG. 6, the networked controller 600 includes networking circuitry 602 and equipment control circuitry 604. A first communications port 606 (shown as Comm. Port A) and a second communications port 608 (shown as Comm. Port B) are provided for the network circuitry 602, while a first control port 610 (shown as Control Port C) and a second control port 612 (shown as Control Port D) are provided for the equipment control circuitry 604. The first communications port 606 and the second communications port 608 are each configured to receive (communicably couple to) a networking cable (e.g., Ethernet cable) to provide connection between the networking circuitry 602 and additional networked controllers 600 or other networking devices (e.g., a network switch, router, etc.). Because, in the example shown, two communications ports 606, 608 are included, the networked controller 600 can be connected to two neighboring networked controllers 600 (one via each port). As described below, this allows networked controllers 600 to be connected in series to form a chain or loop. In other embodiments, the networked controller 600 includes a larger number of communications ports (3, 4, 5, etc.).

The first control port 610 and the second control port 612 are configured to be communicably coupled to building equipment, for example to receive analog or digital signals to the building equipment and to provide analog or digital signals to the bundling equipment. For example, in some embodiments, the first control port 610 is configured as an input port that receive signals from equipment while the second control port 612 is configured as an output port that provides signals to the equipment. Although two control ports 610, 612 are shown in FIG. 6, any number of input and output ports can be provided with the networked controller 600 in various embodiments (e.g., 3, 4, 5, 6, 7, 8, 9, etc.).

The equipment control circuitry 604 is configured to obtain input signals/data from one or more units of building equipment from the first control port 610 and/or the second control port 612, to execute control logic to generate a control output for one or more units of building equipment, and cause the control output to be transmitted to the equipment via the first control port 610 and/or the second control port 612. The control logic executed by the equipment control circuitry 604 may be based on commands received from the networking circuitry 602, for example setpoints, targets, supervisory control decisions, on/off decisions, occupant requests, etc. In one illustrative embodiments, the equipment control circuitry 604 receives a temperature setpoint from the networking circuitry 602, receives a temperature measurement via the first control port 610, and executes feedback control logic (e.g., PID control) to generate a control signal for a unit of heating, ventilation, or air conditioning equipment expected to cause the equipment to drive the measured temperature toward the temperature setpoint, and provides the control signal to the unit of equipment via the second control port 612. In some embodiments, the equipment control circuitry 604 is programmable and reprogrammable to provide suitable control logic for any of the various equipment units, devices, actuators, etc. described herein.

The networking circuitry 602 is configured to facilitate communication between the networked controller 600 and other networked controllers and/or other IT devices communicable with the networking circuitry 602 via the first communication port 606 or the second communication port 608. The networking circuitry 602 is configured to facilitate inclusion of the networked controller 600 in a tree, chain, loop, etc. of controllers, for example by executing a spanning tree protocol in coordination with other controllers in the tree, chain, loop, etc. The networking circuitry 602 can receive data from the first communication port 606 and the second communication port 608 and broadcast or transmit data off the networked controller 600 via the first communication port 606 and the second communication port 608.

In some scenarios, the networking circuitry 602 receives setpoints, settings, targets, on/off requests, or other data relating to operation of the equipment control circuitry 604 via the first communication port 606 and/or the second communication port 608. The networking circuitry 202 can receive such data and provided it to the equipment control circuitry 604. In some embodiments, the networking circuitry 202 receives data relating to operation or control of building equipment from the equipment control circuitry 604 and transmits or broadcasts such data off of the network controller 600 via the first communication port 606 or the second communication port 608.

The networking circuitry 602 is configured to monitor a status of the first communication port 606 and a status of the second communication port 608. The status relates to whether a cable is connected to the port, whether the port itself is properly function, whether communications are being received via the port, etc. The networking circuitry 602 can determine the current statuses of the communication ports 606 and broadcast an status indication in response to the determination. For example, in response to a determination that the first communication port 606 is down (off, disconnected, faulty, broken, not receiving communications, etc.) the networking circuitry 602 can broadcast an indication that the first communication port 606 is down via the second communication port 608.

The networking circuitry 602 is configured to coordinate with networking circuitry of additional networked controllers to determine an order of connection therebetween and identify any breaks in connections therebetween, as described in detail with reference to FIGS. 7-8 below. In some embodiments, the networking circuitry 602 is configured to execute a spanning tree protocol. In some embodiments, the networking circuitry 602 is configured to broadcast and/or receive a discovery message via on or both communication ports 606, 608. In response to receiving the discovery message, the networking circuitry 602 can generate a reply packet for transmission via one or both communication ports 606, 608 which provides data indicative of a status of the networked controller, an identity of the networked controller, a position of the networked controller in a network, etc., in various embodiments. In some embodiments, the reply packet indicates a bridge ID (e.g., identity of the networked controller 600), a designated port ID and root port ID, statuses of the communication ports 606, 608, a physical link status, and a hostname. Multiple networked controller 600 can use broadcast reply packets to determine a map of a network tree, loop, ring, chain, etc. including the controllers. In such scenarios, the networking circuitry 602 can thus self-identify an order of connections between itself and the networking circuitry of other networked controllers and provide the order of connections to an external device (e.g., user device), for example in a JSON or JSTree format.

Figure 7:
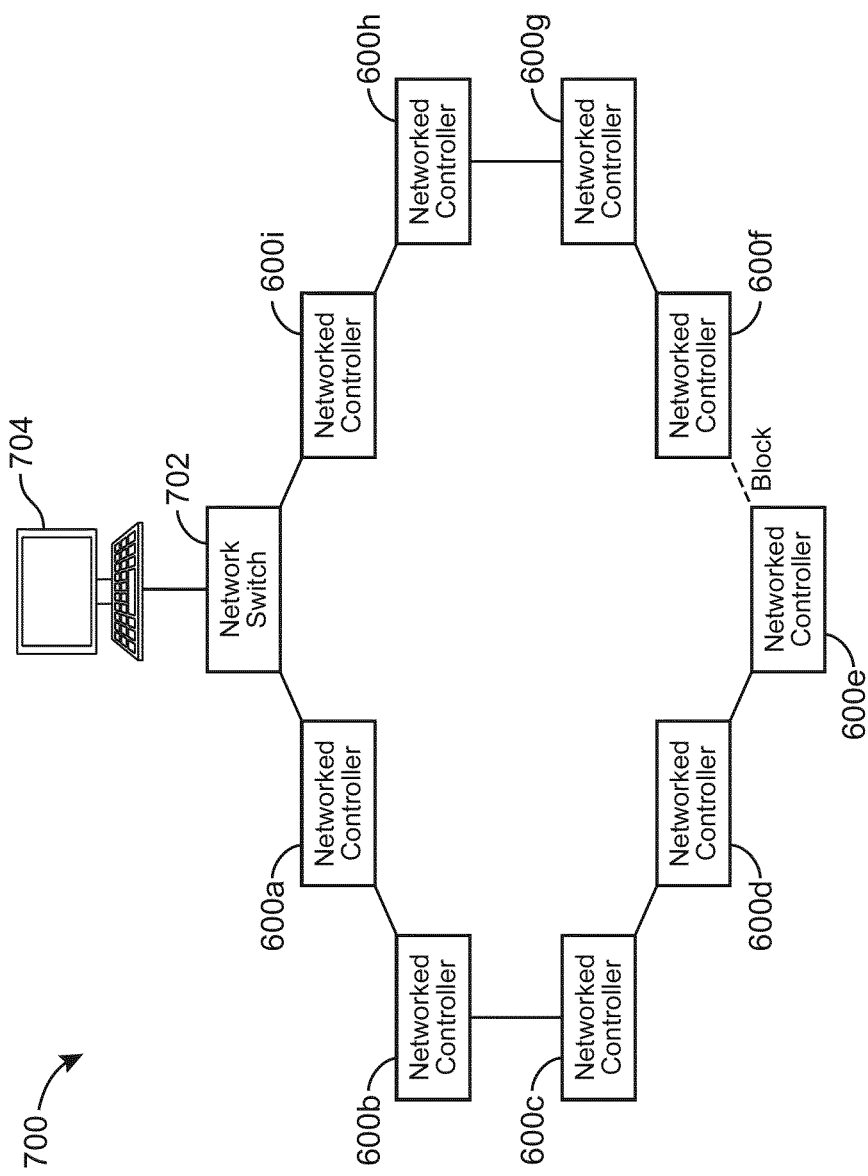
FIG. 7 is a block diagram of a network of networked controllers, according to some embodiments.

Referring now to FIG. 7, an illustration of a network 700 of a plurality of networked controllers (shown as networked controllers 600a-i) is shown, according to some embodiments. In the example shown, the networked controllers 600*a-i* are multiple instances of the networked control 600 of FIG. 6 and described above. The networked controllers 600*a-i* may be substantially identical or may include some variation based on the use or purpose of the different networked controllers 600*a-i* (e.g., different equipment served by different networked controllers 600*a-i*). The network 700 is also shown as including a network switch 702 and a user device 704 connected to the networked controllers 600*a-i* via the network switch 702.

As shown in FIG. 7, the networked controllers 600*a-i* are connected sequentially in a loop, with each networked controller 600*a-i* connected to two neighboring devices (i.e., a neighboring device connected to the first communication port 606 and a second neighboring device connected to the second communication port 608). In the example of FIG. 8, the network switch 702 is connected to a first networked controller 600*a*, which is connected to second networked controller 600*b*, which is connected to a third networked controller 600*c*, which is connected to a fourth networked controller 600*d*, which is connected to a fifth networked controller 600*e*, which is connected to a sixth networked controller 600*f* (noting that this connection is shown as blocked as described below), which is connected to a seventh networked controller 600*g*, which is connected to an eight networked controller 600*h*, which is connected to a ninth networked controller 600*i*, which is connected to the network switch 702 to form the loop shown in FIG. 7. In other embodiments, various loops of different sized, chains, trees, etc. are formed by connection of multiple networked controller 600.

In the example of FIG. 7, the network switch 702 can be a dumb switch (e.g., not a "smart" switch with processing capabilities, network management features etc.) because the networked controller 600*a-i* are capable of self-executing a spanning tree protocol and otherwise managing the connections and communications therebetween. As such, the network switch 702 can be configured as simple networking circuitry configured to connect to one or more or of the networked controllers 600*a-i* (shown as the first networked controller 600*a* and the ninth networked control 600*i*) and an external user device 704. The connection between the network switch 702 and the user device 704 can be over a building IT network, intranet, Internet, WiFi, etc. in various embodiments. The user device 704 can be a smartphone, tablet, laptop computer, desktop computer, virtual reality headset, etc., for example a device with a web browsing application configured to allow user to navigate to a selected network address (e.g., to an IP address of the network switch 702). The user device 704 may correspond to the client device 504 of FIG. 5. In other embodiments, the user device 704 is replaced by a digital twin, for example a digitized version of a user device provided via a cloud service and/or a cloud-based server that provides the functions of a user device 704 in a digital twin environment. In such embodiments, a digital twin environment can be communicable with the network switch 702 via a bridge or live connection between physical devices and digital replicas, for example via OpenBlue Bridge by Johnson Controls.

In the example shown, the first networked controller 600*a* serves as a root of the network 700. In other embodiments, a different networked controller 600*b-i* serves as the root of the network, and the networked controller assigned as the root can adapt over time in response to various conditions or events. Designation of the first networked controller 600*a* as the root allows the networked controller 600*a-i* to self-manage the network thereof, without active management from the network switch 702 or other external device.

The networked controllers 600*a-i* are configured to self-identify an order of the connections therebetween, i.e., the order in which the networked controllers 600*a-i* are connected to one another such as in the loop shown in FIG. 7. To provide the self-identification capability, in some embodiments a root controller (e.g., the first network controller 600*a*) periodically broadcast a discovery message across the network 700. The discovery message can be broadcast every minute, for example. In other examples, the discovery message can be broadcast every five minutes, every fifteen minutes, every hour, once a day, once a week, etc. The discovery message can be transmitted across the networked controllers 600*b-i* and the connections therebetween so that it reaches all of the networked controllers 600*a-i* on the network 700.

In response to the discovery message, the networked controllers 600*b-i* receiving the discovery message can generate a reply packet that includes data indicative of the identity of the corresponding network controller and a status of its communication ports, for example. In some embodiments, the reply packet indicates a bridge ID (e.g., identity of the particular networked controller 600*a-i*), a designated port ID and root port ID, statuses of the communication ports of the particular networked controller 600*a-i*, a physical link status, and a hostname. Each reply packet is broadcast across the network 700 of networked controllers 600*a-i*.

As the reply packets are transmitted across each networked controller 600*a-i*, the networked controllers 600*a-i* may edit, modify, annotate, mark, etc. each reply packet that passes across it to indicate that it was transmitted across that network controller. For example, in the example of FIG. 7, the fourth networked controller 600*d* can transmit a reply packet in both directions around the loop shown in FIG. 7. As the reply packet crosses the third network controller 600*c* and the second networked controller 600*b* to reach the root first networked controller 600*a*, for example, the third networked controller 600*c* can annotate (edit, modify, add to, etc.) the reply packet to indicate that the reply packet crossed the third networked controller 600*c*, and then the second networked controller 600*b* can annotate the reply packet to indicated that the reply packet crossed the second networked controller 600*b*. The annotations can be stored in the reply packet in a sequence/order, such that the reply packet is annotated to store an ordered list of the networked controllers that the reply packet passed through. The reply packet can thus contain data indicative of an order of connection between the networked controllers. By broadcasting reply packets through the network and annotating the reply packets in this manner, the networked controllers 600*a-i* can generate data that allows the networked controller 600*a-i* to self-identify their neighbors on the network, self-identify the order of connections between networked controllers 600*a-i*, and self-identify a map of the loop, tree, chain, etc. of the networked controllers 600*a-i* of the network 700. These steps can be executed without active input or management from the network switch 702.

In some embodiments, the first networked controller 600*a* serving as the root of the network 700 receives the various annotated reply packets and processes the reply packets to determine the order of connections between the networked controllers 600*a-i*. The first networked controller 600*a* can generate data indicative of the order in a JSTree or JSON format, for example, The order of connections can then be provided to the user device 704 via the network switch 702. The networked controllers 600*a-i* can also use the determined order of connections to facilitate efficient and reliable transmission of data, instructions, commands, setpoints, requests, etc. to the various networked controllers 600a-i via the network 700.

In some scenarios, for example as shown in FIG. 7, the networked controllers 600a-i self-identify a break in a connection between two of the networked controllers 600a-i. In the example shown, the fifth networked controller 600e was previously self-identified as being connected to the sixth networked controller 600f (e.g., a second communications port of the fifth networked controller 600e connected to a first communications port of the sixth networked controller 600f by an Ethernet cable or other communications channel). The example of FIG. 7 shows a scenario in which this connection is lost, for example due to a physical failure of the Ethernet cable (e.g., the cable being cut, frayed, etc.) or other connection pathway, physical disconnection of the cable form a communication port of the one of the networked controllers 600e, 600f, failure of the communication port, software error blocking communications, etc.

The networked controllers 600a-i are configured to automatically detect this loss of connection. For example, if a connection is broken, blocked, failed, etc., the reply packets discussed above will not transmit across the connection, such that the data collected in the reply packets during their transmission through the network 700 will reflect the lack of such a connection. In the example shown, following the break or blockage of the connection between the fifth networked controller 600e and the sixth networked controller 600f, a reply packet would no longer reflect that it was transmitted from the fifth networked controller 600e to the sixth networked controller 600f or vice versa. One or more of the networked controllers 600a-i can use this information to detect a change in the order of connections and use that change to flag that a break occurred.

As another example, the network controller 600e and the networked controller 600f can monitor the statuses of the communication ports of those controllers, and detect when communications cease arriving or successfully outgoing from a particular communication port. Failure at a communication port can be detected and an indication thereof transmitted over the networked to identify the break. The detected and indicated loss of communication at a port can be compared to the determined order of connection of the networked controllers 600a-i to determine the location of the lost connection in the network 700. An alert, alarm, notification, update, etc. can be transmitted to the user device 704 in response to self-detection of the lost connection by the networked controllers 600a-i. The networked controllers 600a-i can also automatically reconfigure the routing of communications therethrough to ensure continued communication to all networked controllers 600a-i, thus automatically adapting to the change caused by the lost connection.

Due to the redundancy of the loop architecture shown in FIG. 7, all networked controllers 600a-i remain communicable with one another even after the loss of connection at the segment between the networked controller 6003 and the networked controller 600f. Thus, the feature of automatically self-identifying a lost/broken connection can be performed before communication is lost to any of the controllers. Such a feature can enable, for example, repair of the lost connection to ensure continued redundancy without experiencing errors, failures, off periods, etc. for a disconnected controller. The detection of lost connection segments described here therefore has advantages over an alternative approach of detecting whether a networked controller has disappeared from the network due to complete loss of communication with that controller.

Figure 8:
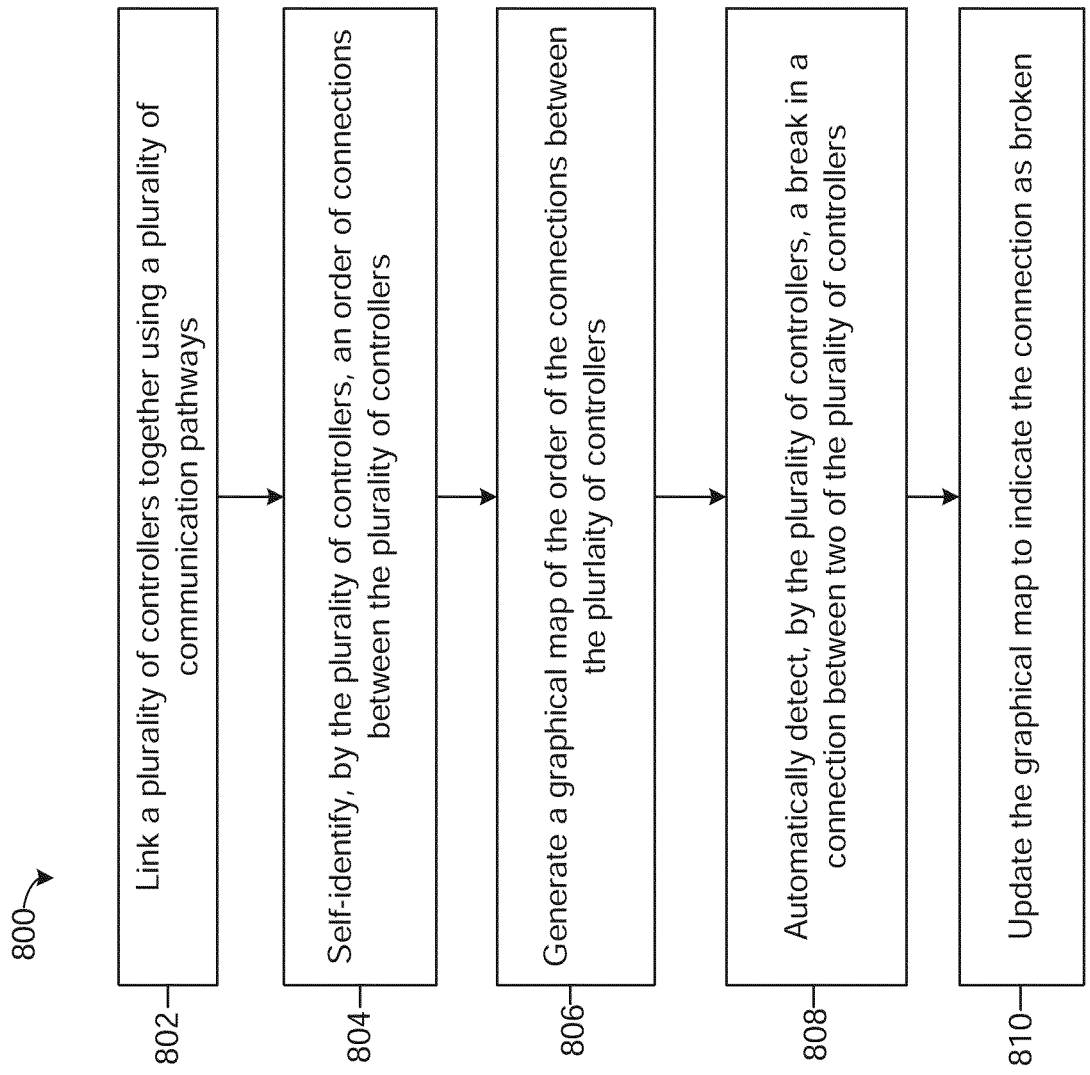
FIG. 8 is a flowchart of a process for automatically mapping connections and identifying broken connections in a network of networked controllers, according to some embodiments.

Referring now to FIG. 8, a flowchart of a process 800 for mapping connections between networked controllers and identifying lost connections in a network of controllers is shown, according to some embodiments. The process 800 can be executed using multiple instances of the networked controller 600 of FIG. 6, for example arranged in a network as shown in FIG. 7, in various embodiments.

At step 802, a plurality of controllers (e.g., networked controllers 600a-i) are linked together using a plurality of communication pathways. For example the controllers can be wired together using Ethernet cables received by ports of the controllers, for example. In other embodiments, the controllers are wirelessly communicable, for example by forming a mesh WiFi networking, such that the communication pathways between the controllers are wireless pathways.

At step 804, the plurality of controllers self-identify an order of connections between the plurality of controllers. The self-identification can be performed as described in detail above with reference to FIG. 7, i.e., by transmission of data packets across the plurality of controllers with the data packets edited, annotated, modified, augmented, etc. at each controller to indicate that it passed therethrough. Such data packets can be obtained and processed at step 804 to determine the order of connections between the plurality of controllers.

Figure 9:
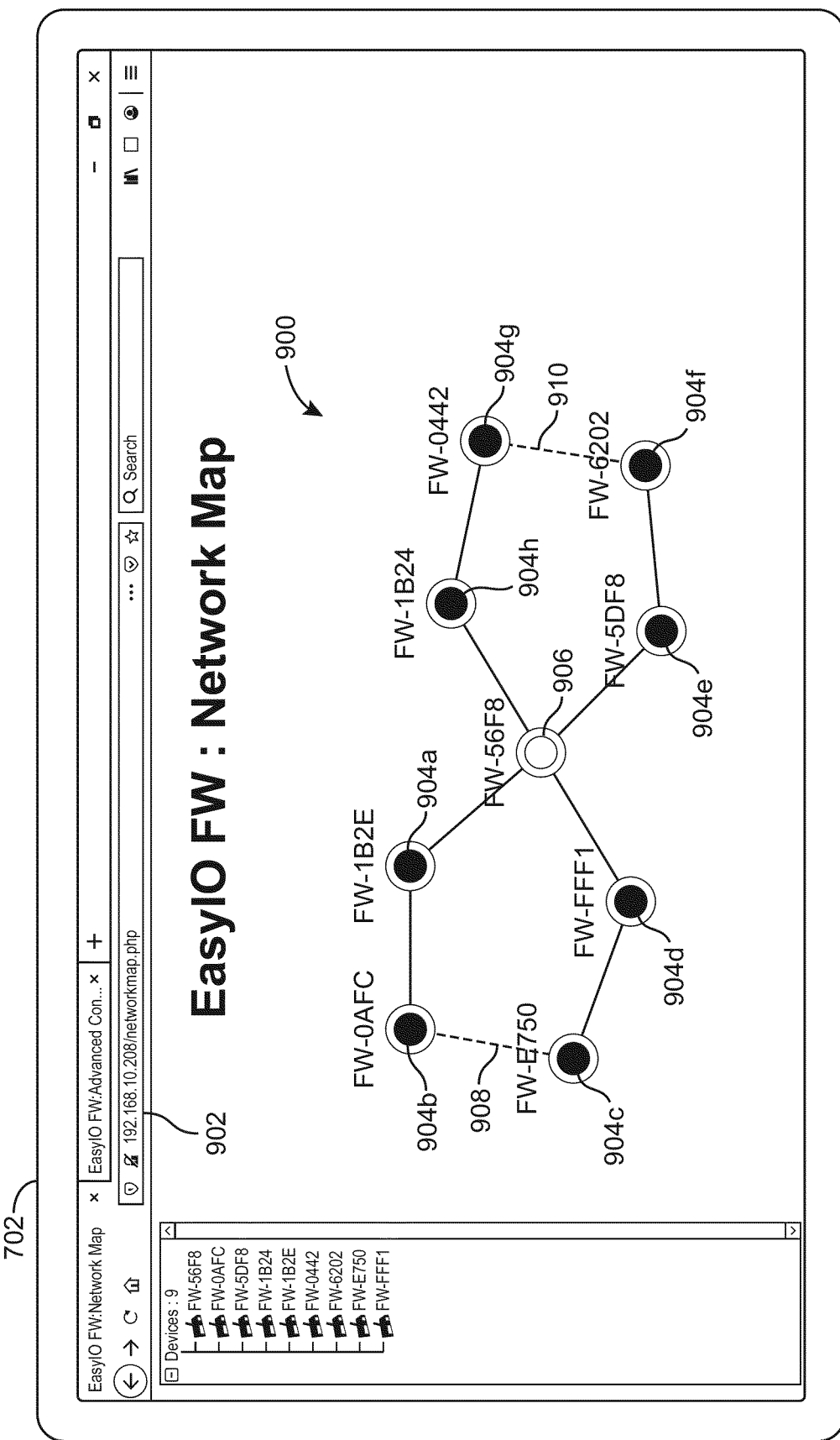
FIG. 9 is an illustration of a first example graphical map of a network of networked controllers displayed on a user device, according to some embodiments.
Figure 10:
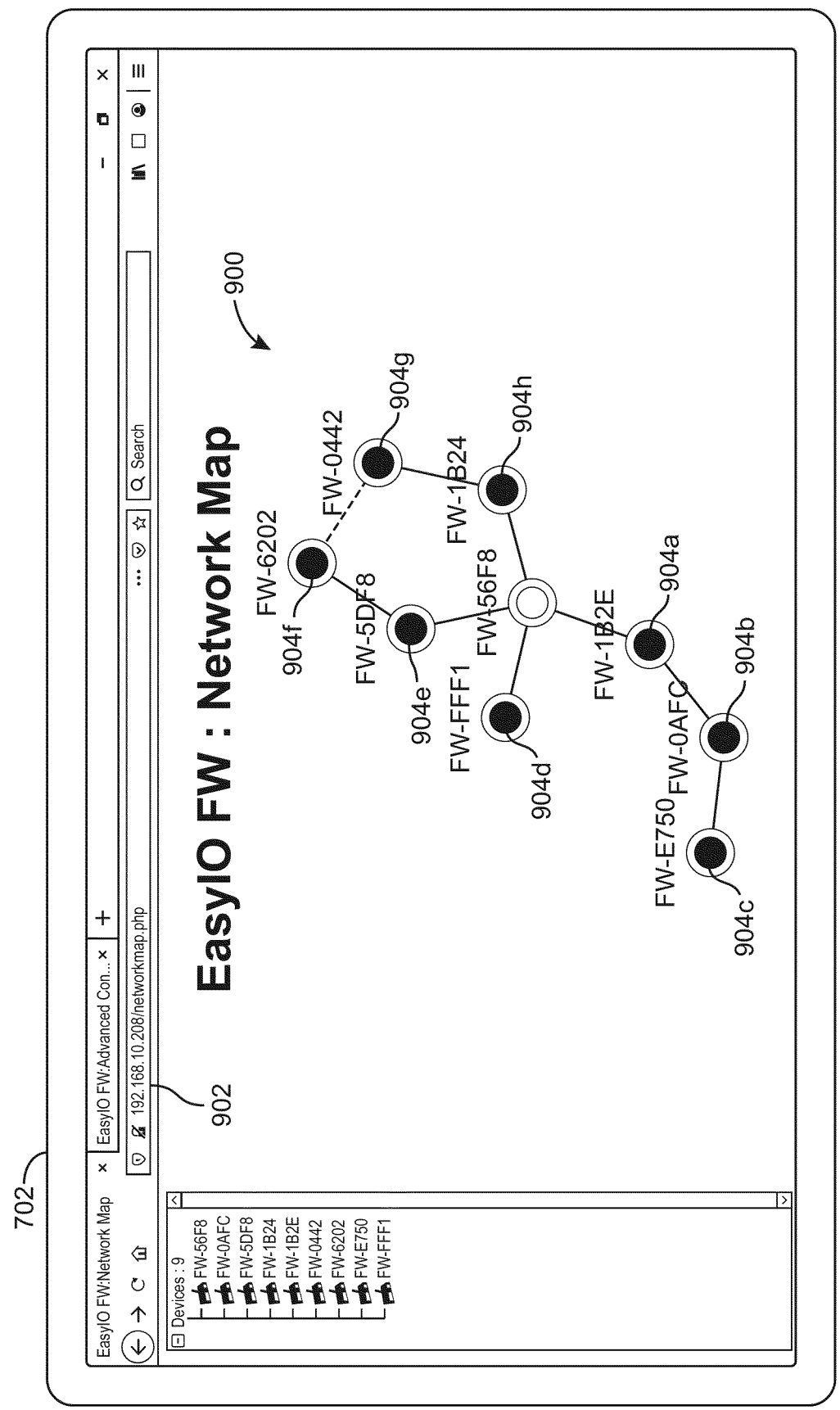
FIG. 10 is an illustration of a second example graphical map of a network of networked controllers displayed on a user device, according to some embodiments.

At step 806, a graphical map of the order of the connections between the plurality of controllers is generated. Example graphical maps are shown in FIGS. 9-10, for example. Generating the graphical map can include representing each networked controller as a node (e.g., with a circle, box, polygon, area, etc.) and each connection as a line (segment, link, etc.) between the appropriate nodes. The nodes can be spatially arranged over a display area based on the order of the connections, for example using logic that prevents the connection lines from intersecting and maintains at least a threshold spacing between the nodes. Step 806 can include displaying the graphical map via a graphical user interface, for example a web-based graphical user interface accessible via a web browser.

At step 808, the plurality of controllers automatically detect a break in a connection between two of the plurality of controllers. The break in the connection can be due to a disconnected, cut, or damaged cable or some other technical failure which cause a loss, interruption, blockage, etc. of the connection between two of the plurality of controllers. The break in the connection does not necessarily result in complete loss of communication to a controller, for example where a loop architecture provides redundancy. The break can be detected as discussed above with reference to FIG. 7, for example. In some embodiments, the break is detected locally on a controller at one end of the broken connection. In such embodiments, the controller is configured to monitor the status of communication ports and detect the break in response to determining that expected communications are not being received at one of the communication ports, for example if a periodic broadcast from a root controller is not received by an expected time. Step 808 can include generating a data packet, file, message, etc. that identifies the broken connection (e.g., by listing identities of the two controllers previously linked by the broken connection).

At step 810, the graphical map is updated to indicate the broken connection as being broken, lost, blocked, etc. Example graphical maps showing broken connections are illustrated in FIGS. 9-10, described below. By indicating the broken connection on the graphical map, the graphical map allows a user to easily see where the connection was lost, to gather information that can guide repairs of the broken connection, to see whether the connection is crucial or worthwhile to repair (e.g., whether additional redundancies are present), etc. In some embodiments, step 810 can include generating an alert or alarm (e.g., audible alert, push notification, email notification, etc.) transmitted to a user as a warning that the break occurred. A user can thus be made quickly aware of the broken connection, even where self-healing of a redundant network automatically avoids any loss of functionality of the controllers or the building equipment controlled by the controllers. Network connection issues can then be addressed before a loss of connection manifests as a failed or incorrect operation of building equipment, for example before a building becomes uncomfortable due to loss of control of one or more units of building equipment.

In some embodiments, the graphical map is generated, provided, maintained, etc. by circuitry (e.g., user device, server, data center, cloud-based computing resources, etc.) that maintains a digital twin of a building and devices, equipment, assets, occupants, and/or other entities relating to the building. For example, data objects and models can be defined and maintained using a common data object framework that allows for integration of digital replicas of various devices, equipment, assets, etc. The digital twin may include a floorplan or three-dimensional model of the building and define locations of assets, equipment, devices, etc. therein, for example. In some such embodiments, steps 806 and 810 can include overlaying the graphical map of the plurality of controllers and the connections therebetween on a floor plan or three-dimension model of the building in which the controllers are deployed. As another example, the graphical map of the plurality of controllers can include a graphical representation of the various equipment units served by the plurality of controllers. A full digital replica of the plurality of controllers, the relationships therebetween, and relationships between the controllers and the building and other equipment, assets, devices, etc. can thus be generated and dynamically updated to provide a digital twin of physical system. Furthermore, in some such embodiments, the steps of receiving indications from the plurality of controllers, generating and updating the graphical map, and other such functions described herein can be performed on a digital replica of a local computing device hosted within the digital twin environment, such that the operations are performed in the digital twin environment rather than, or in addition to, on local devices distributed in the physical environment. The language used herein is intended to be inclusive of such examples.

Referring now to FIG. 9, a first example illustration of a graphical map 900 of a controller network displayed on a user device 702 is shown, according to an example embodiment. FIG. 9 shows the graphical map in an example scenario involving an example number of networked controllers arranged in an example architecture. The graphical map 900 is adaptable based on the self-determined order of connections in various scenarios, for various collections of devices, etc. In the example shown, the graphical map 900 can be accessed by the user device 702 by navigating to an IP address for the controller network, as shown in the address bar 902 of FIG. 9. In other embodiments, the graphical map 900 is provided via a mobile application or local program installed on the user device 902.

As shown in FIG. 9, the graphical map 900 includes a plurality of standard nodes 904*a*-*h* and a root node 906. The standard nodes 904 and the root node 906 represent networked controllers and are labeled with controller identities (IDs) (e.g., "FW-0AFC" for standard node 904*b*). The root node 906 corresponds to the networked controller which serves as the root of the network, and is shown in FIG. 9 in a different color than the standard nodes 904 to highlight the root node 906.

In the example shown, the standard nodes 904*a*-*h* are arranged in two loops joined at the root node 906, which connects to four standard nodes (904*a*, 904*d*, 904*e*, 904*h*) (i.e., in a figure-eight arrangement). The order and geometry shown in the graphical map 900 is automatically self-identified by the corresponding networked controllers and used to automatically generate the graphical map 900.

The example shown also includes a first broken connection 908 and a second broken connection 910, showing where the controllers automatically self-detected broken connections between neighboring controllers. In particular, the first broken connection 908 indicates that connection was lost between the controllers represented by standard nodes 904*b* and 904*c*, while the second broken connection 910 indicates that connection was lost between the controllers represented by standard nodes 904*f* and 904*g*. The broken connections can be visually differentiated from other connection segments/lines, for example given a different color (e.g., red) than other lines (e.g., shown in black), provided as a dashed-line, or otherwise highlighted or distinguished. The graphical map 900 thus allows user to easily see that two connections have been lost/broken in the network, identify where the breaks lie in the network (e.g., which controllers are endpoints of the broken connection), and to see that redundancy in the figure-eight architecture of the network provides continued communication to all controllers on the network. A user can thus obtain information that guides repair of broken connections before loss of communication to any controllers occurs, i.e., before a node is completely disconnected from the other nodes. In some scenarios, a user may determine that a repair can be delayed or foregone based on the graphical map 900.

Referring now to FIG. 10, another example illustration of the graphical map 900 displayed on the user device 702 is shown, according to an exemplary embodiment. The example of FIG. 10 may be reached following an updated to the network and a re-identification of network connections by the controllers following the update. In particular, the illustration shows an example where the controller corresponding to node 904*d* was intentionally disconnected from the controller corresponding to node 904*c*, and the broken connection 908 was repaired. FIG. 10 thus illustrates that the graphical map 900 can change and update over time in response to lost connections, deliberate removal or rearrangement of connections, addition of controllers or connections, etc. The systems and methods described herein thus provide dynamic outputs that reflect current, real-world network conditions.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A user device for a system for controlling a plurality of units of building equipment, the system comprising a plurality of controllers associated with the plurality of units of building equipment, the plurality of controllers comprising a plurality of communication ports and configured to be linked by connections using a plurality of cables connected to the plurality of communication ports, the user device comprising:
   circuitry communicable with the plurality of controllers and configured to:
      receive a signal indicative of an order of the connections between the plurality of controllers from the plurality of controllers;
      generate a graphical map of the order of the connections between the plurality of controllers based on the signal;
      receive, from the plurality of controllers, an indication of a break in a connection of the connection; and
      update the graphical map to indicate the connection as broken.

2. The user device of claim 1, further comprising a passive network switch coupled to one or more of the plurality of cables.

3. The user device of claim 1, wherein a spanning tree protocol is executed locally on the plurality of controllers.

4. The user device of claim 1, wherein the plurality of controllers are configured to detect a loss of connection at one of the plurality of communication ports and, in response to detecting the loss of the connection, cause the signal to be transmitted to the circuitry or digital twin.

5. The user device of claim 1, wherein the plurality of controllers are connected together in a loop configuration before the break in the connection; and
   wherein the plurality of controllers are configured to automatically self-heal from the loop configuration to a chain configuration.

6. The user device of claim 1, wherein the plurality of controllers are configured to self-identify the order of the connections between the plurality of controllers by:
   periodically broadcasting, from a first controller of the plurality of controllers, a discovery message;
   in response to the discovery message, broadcasting, from a remainder of the plurality of controllers, a data packet indicating at least two of a controller identity, a designated port identity, a root port identity, a port status, a physical link status, and a hostname; and
   identifying the order of connections based on the data packet.

7. The user device of claim 1, wherein the graphical map comprises a node for each of the plurality of controllers and a plurality of lines indicating the connections between the plurality of controllers.

8. The user device of claim 1, wherein the plurality of controllers comprise a plurality of control ports configured to be connected to the plurality of units of building equipment, wherein the plurality of controllers are configured to receive inputs from the plurality of units of building equipment and transmit control outputs to the plurality of units of building equipment via the plurality of control ports.

9. A method, comprising:
   linking together a plurality of controllers using a plurality of communication pathways;
   generating a graphical map of connections between the plurality of controllers on a user device;
   in response to detecting a loss of connection, generating a signal indicative of a break in a first connection of the connections; and
   updating the graphical map to indicate the first connection as broken.

10. The method of claim 9, further comprising connecting a passive network switch to at least one of the plurality of controllers.

11. The method of claim 9, comprising executing a spanning tree protocol locally on the plurality of controllers.

12. The method of claim 9, wherein updating the graphical map to indicate the first connection as broken by changing a color of a graphical representation of the first connection; and
   wherein the method further comprises providing the graphical map to a user via web browser.

13. The method of claim 9, wherein linking together the plurality of controllers comprises creating a loop configuration, the method further comprising automatically self-healing the loop configuration to a chain configuration in response to the break.

14. The method of claim 9 further comprising self-identifying, by the plurality of controllers, an order of connections between the plurality of controllers by:
   periodically broadcasting, from a first controller of the plurality of controllers, a discovery message;

in response to the discovery message, broadcasting, from a remainder of the plurality of controllers, a data packet indicating at least two of a controller identity, a designated port identity, a root port identity, a port status, a physical link status, and a hostname; and identifying the order of connections based on the data packet.

15. The method of claim 9, wherein the graphical map comprises a node for each of the plurality of controllers and a plurality of lines indicating the connections between the plurality of controllers.

16. The method of claim 9, further comprises controlling, by the plurality of controllers, a plurality of units of building equipment.

17. A controller comprising:
a plurality of communication ports configured to be placed in communication with a plurality of additional controllers;
circuitry configured to:
automatically determine identities of the plurality of additional controllers and an order of connections of the controller and the plurality of additional controllers;
automatically detect a break in a connection between at least one of the plurality of communication ports and at least one of the plurality of additional controllers by monitoring statuses of the plurality of communication ports; and
transmit, to a user device, a first indication of the order of the connections of the controller and the plurality of additional controllers and a second indication of the break.

18. The controller of claim 17, wherein the controller is configured to execute a spanning tree protocol.

19. The controller of claim 17, wherein the second indication is configured to cause an alert to be provided to a user.

20. The controller of claim 17, wherein the circuitry is further configured to generate control signals for building equipment and cause the control signals to be communicated to the building equipment via at least one of a plurality of control ports.

* * * * *